(12) United States Patent
Dou et al.

(10) Patent No.: US 6,426,839 B2
(45) Date of Patent: Jul. 30, 2002

(54) IMAGE PICKUP LENS UNIT

(75) Inventors: Satoshi Dou, Tsurugashima; Toshiyuki Yoshida, Machida, both of (JP)

(73) Assignee: Milestone Co., Ltd., Tokyo (JP)

( * ) Notice: Subject to any disclaimer, the term of this patent is extended or adjusted under 35 U.S.C. 154(b) by 0 days.

(21) Appl. No.: 09/746,589

(22) Filed: Dec. 21, 2000

(30) Foreign Application Priority Data

Jun. 27, 2000 (JP) ........................................ 2000-192865

(51) Int. Cl.[7] ........................... G02B 7/02; G02B 15/22; G02B 15/14
(52) U.S. Cl. ........................ 359/823; 359/819; 359/693; 359/699
(58) Field of Search .................................. 359/819, 823, 359/825, 693, 694, 699, 700, 701, 703, 705; 353/100; 396/529

(56) References Cited

U.S. PATENT DOCUMENTS

| | | | | |
|---|---|---|---|---|
| 5,054,886 A | * | 10/1991 | Ozaki et al. | ................. 359/823 |
| 5,117,311 A | * | 5/1992 | Nomura | ....................... 359/819 |
| 5,161,061 A | * | 11/1992 | Ihara et al. | ................. 359/708 |
| 5,768,649 A | * | 6/1998 | Pearson | ....................... 396/529 |
| 6,205,293 B1 | * | 3/2001 | DiRisio et al. | ................. 396/6 |
| 6,317,273 B1 | * | 11/2001 | Takanashi | ................... 359/699 |

* cited by examiner

*Primary Examiner*—Georgia Epps
*Assistant Examiner*—Saeed Seyrafi
(74) *Attorney, Agent, or Firm*—Koda & Androlia

(57) ABSTRACT

An image pickup lens unit includes, as viewed from an object side, a retainer having an aperture stop, an image pickup lens, and a holder. The retainer having an aperture stop and the image pickup lens are united with each other. The holder assumes a substantially cylindrical shape and accommodates the image pickup lens such that the image pickup lens is united with the holder in a manner movable in relation to the holder, whereby movement of the retainer having an aperture stop causes the image pickup lens to move in relation to the holder to thereby carry out focus adjustment.

17 Claims, 6 Drawing Sheets

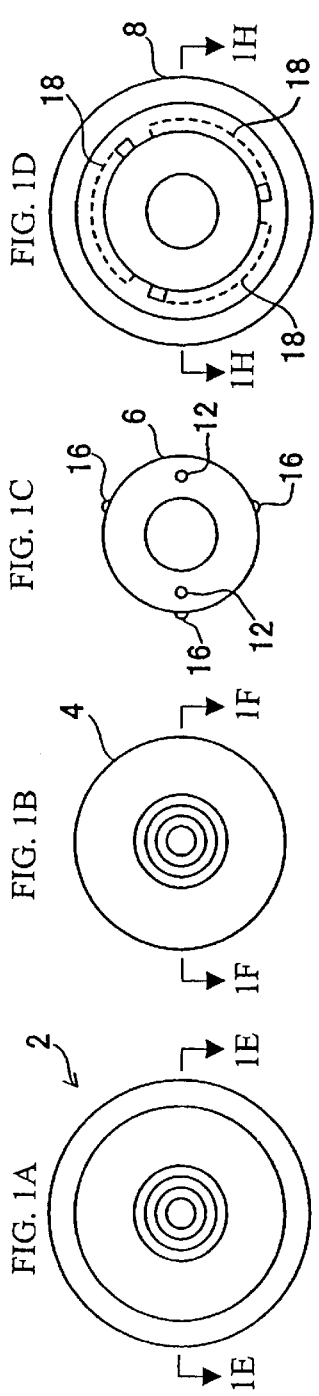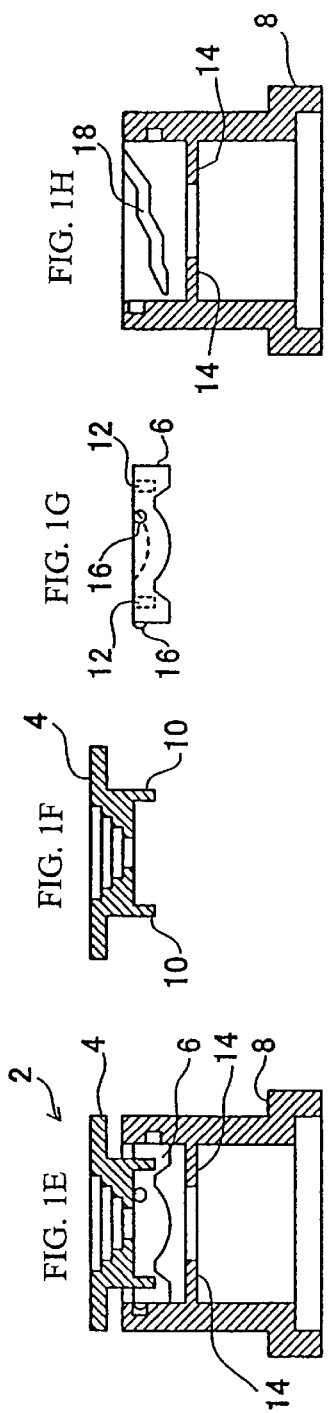

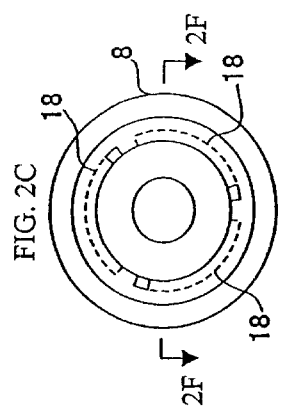
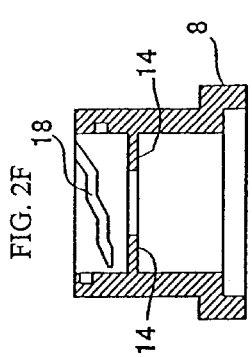
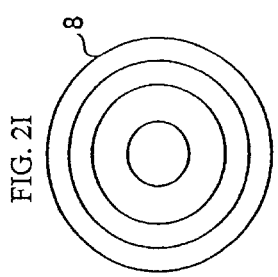
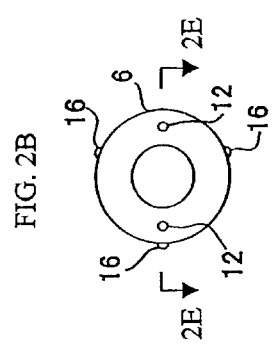
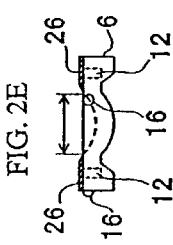
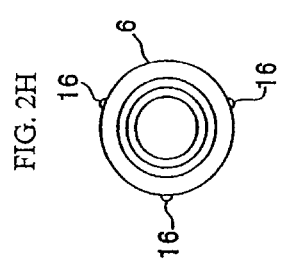
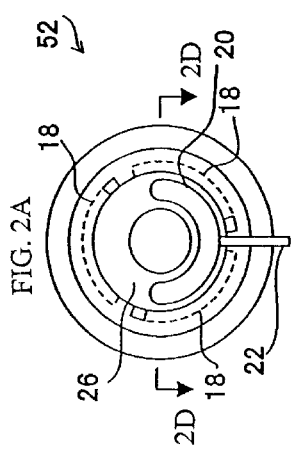
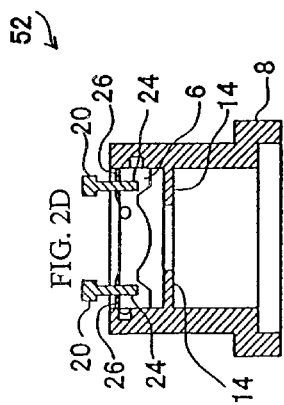
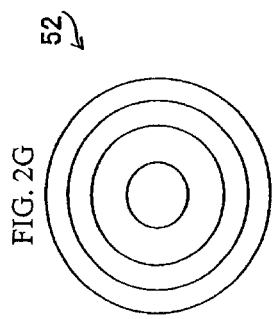
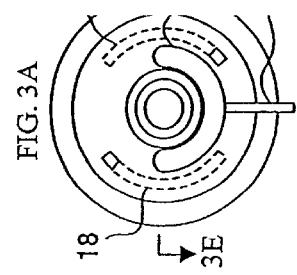
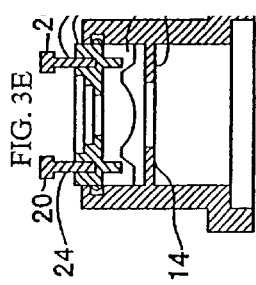
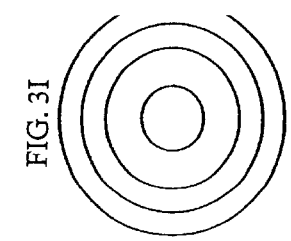

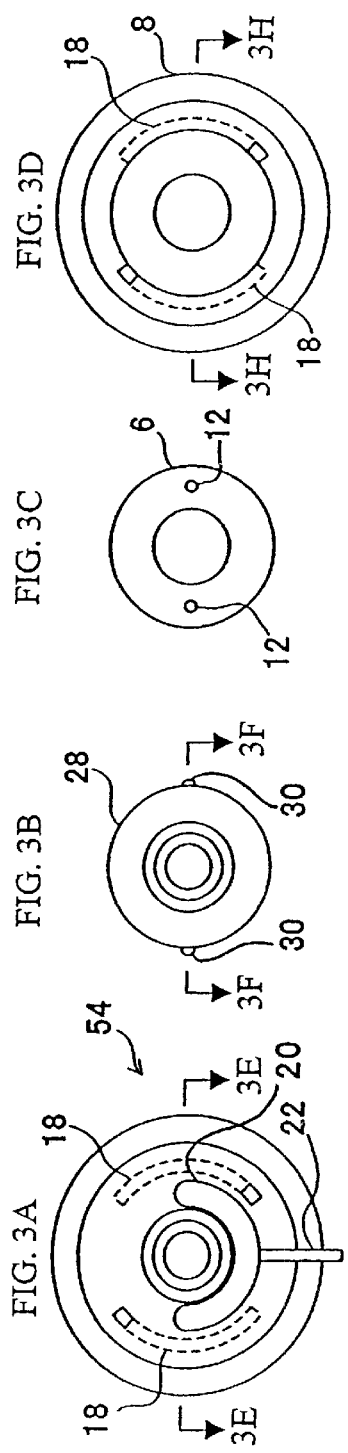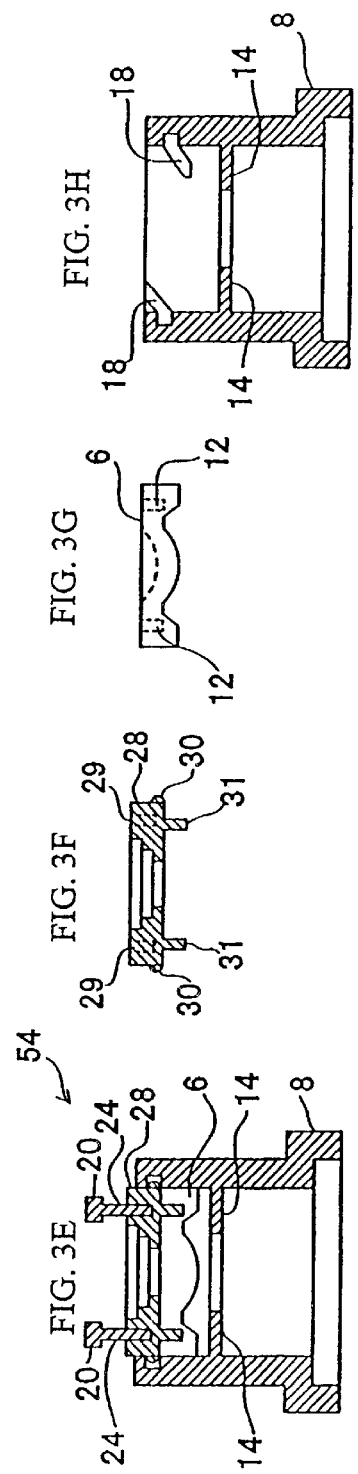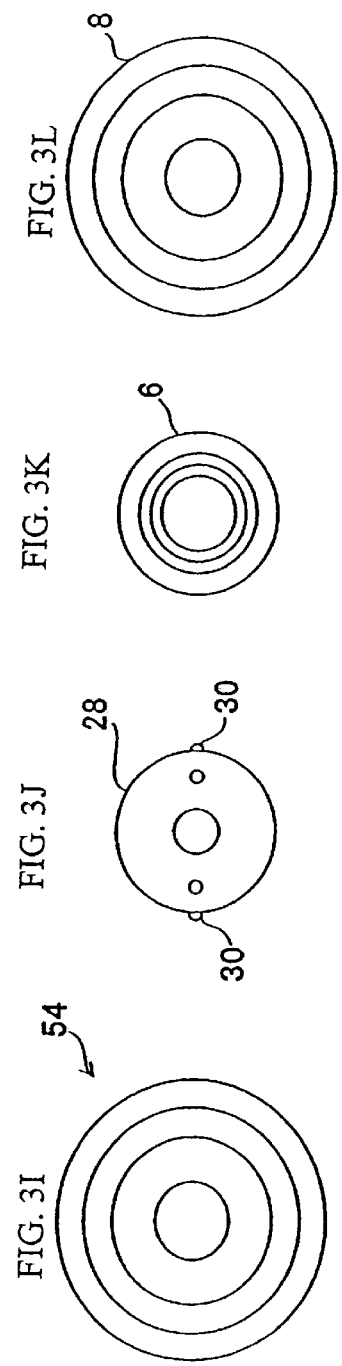

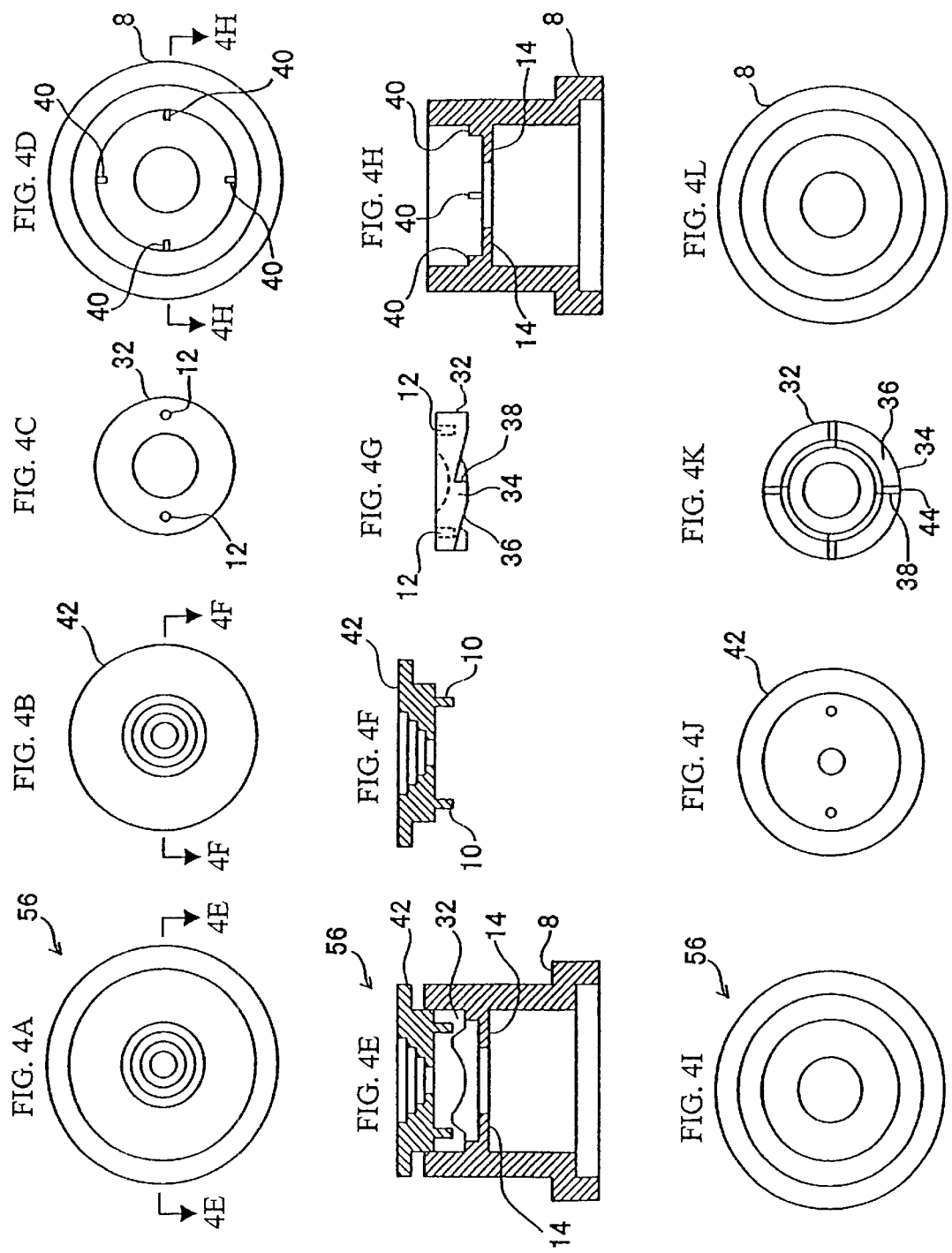

IMAGE PICKUP LENS UNIT

BACKGROUND OF THE INVENTION

1. Field of the Invention.

The present invention relates to an image pickup lens unit. More particularly, the invention relates to an image pickup lens unit for use with a small-sized CCD or CMOS, which serves as an image pickup element, and which enables an image pickup lens to be united with a holder without being incorporated into a barrel.

2. Description of the Related Art

Conventionally, as shown in FIG. 6, an image pickup lens unit for use with a CCD or CMOS is composed of at least five components; namely, a lens barrel, a lens retainer, an image pickup lens, a stop, :and a holder. However, it has been possible to freely perform focus adjustment of the image pickup lens after assembly thereof.

In recent years, there has been a demand for very significant reductions in both the size and cost of electronic camera equipment. In this environment, the image pickup lens unit for cameras are required to reduce the number of components, size,. and cost. Particularly, there has been a movement to unify the holder and the lens in the monitor lens unit used in mobile equipment or cellular phones in order to accommodate the trend towards reductions in the size and cost of such equipment.

In order to meet the above requirement, an united-type image pickup lens unit has been devised in which a lens is fitted into a holder, for use in electronic camera equipment employing a solid image pickup element. The image pickup lens unit is composed of three components; namely, a retainer having an aperture stop, an image pickup lens, and a holder. Alternatively, the lens surface is subjected to printing so as to form an aperture stop, instead of using a retainer having an aperture stop. Therefore, the image pickup lens unit is composed of two components; namely, an image pickup lens and a holder, thereby-realizing low cost through simplified assembly and a reduction in the number of components. Since the number of components is small, such an image pickup lens unit can be easily assembled and is therefore suitable for mass production.

However, since the above image pickup lens unit employing a united lens-and-holder structure does not have a focusing mechanism after assembly, maintaining high standards of manufacturing accuracy of respective components and the attachment accuracy of a CCD or CMOS are very important in terms of image quality. Specifically, the shorter the focal distance of the image pickup lens unit, the more important the distance of the image pickup lens and an image plane, as of a CCD or CMOS, becomes in terms of image quality. Since an image pickup lens for use with the above-mentioned image pickup element employs high-brightness; specifically Fno=2.0–2.8, the focal depth becomes shallow. As a result, even a minor error in lens position causes defocus. In other words, since manufacturing errors of the respective components cause a variation in the design distance to an object, defocus will occur even when the distance to an object is set to the design distance in the course of mass production, resulting in poor image quality or an unfocused image.

Furthermore, an machining error of an image pickup lens, a contraction error of an image pickup lens in the course of molding, or a holder dimensional error, for example, will cause a defect in the final image. Accordingly, even when the united lens-and-holder structure is employed in an attempt to reduce cost and weight and in an attempt to facilitate mass production, defects will frequently result unless a focusing mechanism is employed, so that the costs increase undesirably, and mass production becomes difficult.

SUMMARY OF THE INVENTION

In view of growing demands for inexpensive high-performance lenses so as to be compatible with electronic image pickup equipment which is undergoing reduction in size and weight, an object of the present invention is to provide a small-sized, inexpensive, high-performance image pickup lens unit.

More particularly, an object of the present invention is to provide a high-performance image pickup lens unit for use with electronic image pickup equipment, enabling an image pickup lens and a holder to be united with each other through, for example, fitting, so as to avoid use of a barrel—which is conventionally used to hold and adjust the lens—for reduction in weight and costs, and enabling focusing after assembly.

Herein, an assembly obtained through incorporation of an image pickup lens into a peripheral component (a holder, for example) is called an "image pickup lens unit."

A first aspect of the present invention provides an image pickup lens unit comprising, as viewed from an object side, a retainer having an aperture stop, an image pickup lens, and a holder. The retainer and the image pickup lens are united with each other. The holder assumes a substantially cylindrical shape and accommodates the image pickup lens such that the image pickup lens is united with the holder in a manner movable in relation to the holder, whereby movement of the retainer causes the image pickup lens to move in relation to the holder to thereby carry out focus adjustment.

According to the first aspect, movement of the retainer having an aperture stop causes the image pickup lens to move, since the image pickup lens is united with the retainer. The image pickup lens moves while being accommodated within the holder, thereby maintaining a state in which the image pickup lens is united with the holder. Through movement of the image pickup lens, the image pickup lens is focused.

A second aspect of the present invention provides an image pickup lens unit comprising, as viewed from an object side, a retainer having an aperture stop and assuming a circular cross section, an image pickup lens assuming a circular cross section, and a holder assuming a circular cross section. The retainer and the image pickup, lens are united with each other. At least one protrusion is formed on a circumferential portion of the image pickup lens. The holder assumes a substantially cylindrical shape and has an elongated groove formed on an inner cylindrical wall thereof in such a manner that the groove extends in the circumferential direction and inclines in the axial direction. The holder accommodates the image pickup lens such that the protrusion is fitted into the elongated groove to thereby unite the image pickup lens with the holder in a manner movable along the elongated groove in relation to the holder, whereby rotation of the retainer causes the image pickup lens to move along the elongated groove in relation to the holder, thereby moving the image pickup lens axially so as to carry out focus adjustment.

According to the second aspect, when the retainer having an aperture stop is rotated, the image pickup lens rotates and moves, since the image pickup lens is united with the retainer. The protrusion formed on the circumferential portion of the image pickup lens is fitted into the elongated groove, which is formed on the inner cylindrical wall of the holder. Accordingly, as the image pickup lens rotates, the protrusion moves along the elongated groove, which inclines in the axial direction of the holder; as a result, the image pickup lens moves axially. The image pickup lens moves rotatively while being accommodated within the holder, thereby maintaining a state in which the image pickup lens is united with the holder. Through axial movement of the image pickup lens, the image pickup lens is focused.

A third aspect of the present invention provides an image pickup lens unit comprising, as viewed from an object side, an image pickup lens assuming a circular cross section; and a holder assuming a circular cross section. The surface of the image pickup lens which faces an object, the surface of the image pickup lens which faces an image plane, or both of the surfaces are subjected to printing at a peripheral portion(s) thereof so as to form an aperture stop. At least one protrusion is formed on a circumferential portion of the image pickup lens. The holder assumes a substantially cylindrical shape and has an elongated groove formed on an inner cylindrical wall thereof in such a manner that the groove extends in the circumferential direction and inclines in the axial direction. The holder accommodates the image pickup lens such that the protrusion is fitted into the elongated groove to thereby unite the image pickup lens with the holder in a manner movable along the elongated groove in relation to the holder, whereby rotation of the image pickup lens causes the image pickup lens to move along the elongated groove in relation to the holder, thereby moving the image pickup lens axially so as to carry out focus adjustment.

According to the third aspect, the protrusion formed on the circumferential portion of the image pickup lens is fitted into the elongated groove, which is formed on the inner cylindrical wall of the holder. Accordingly, as the image pickup lens rotates, the protrusion moves along the elongated groove, which inclines in the axial direction of the holder; as a result, the image pickup lens moves axially. The image pickup lens moves rotatively while being accommodated within the holder, thereby maintaining a state in which the image pickup lens is united with the holder. Through axial movement of the image pickup lens, the image pickup lens is focused.

A fourth aspect of the present invention provides an image pickup lens unit comprising, as viewed from an object side, a retainer having an aperture stop and assuming a circular cross section, an image pickup lens assuming a circular cross section, and a holder assuming a circular cross section. The retainer and the image pickup lens are united with each other. At least one protrusion is formed on a circumferential portion of the retainer. The holder assumes a substantially cylindrical shape and has an elongated groove formed on an inner cylindrical wall thereof in such a manner that the groove extends in the circumferential direction and inclines in the axial direction. The holder accommodates the image pickup lens such that the protrusion is fitted into the elongated groove to thereby unite the retainer with the holder in a manner movable along the elongated groove in relation to the holder, whereby rotation of the retainer causes the image pickup lens to move along the elongated groove in relation to the holder, thereby moving the image pickup lens axially so as to carry out focus adjustment.

According to the fourth aspect, when the retainer having an aperture stop is. rotated, the image pickup lens rotates and moves, since the image pickup lens is united with the retainer. The protrusion formed on the circumferential portion of the retainer is fitted into the elongated groove, which is formed on the inner cylindrical wall of the holder. Accordingly, as the retainer rotates, the protrusion moves along the elongated groove, which inclines in. the axial direction of the holder; as a result, the retainer moves axially, and thus the image pickup lens moves axially. The image pickup lens moves rotatively while being accommodated within the holder, thereby maintaining a state in which the image pickup lens is united with the holder. Through axial movement of the image pickup lens, the image pickup lens is focused.

A fifth aspect of the present invention provides an image pickup lens unit comprising, as viewed from an object side, a retainer having an aperture stop and assuming a circular cross section, an image pickup lens assuming a circular cross section, and a holder assuming a circular cross section. The retainer and the image pickup lens are united with each other. At least two toothlets are formed on a peripheral portion of a surface of the image pickup lens which faces an image plane, such that upper faces thereof have sloped surfaces formed along the circumference of the image pickup lens. The holder assumes a substantially cylindrical shape and has at least two protrusions formed on an inner cylindrical wall thereof so as to hold the image pickup lens through contact between the protrusions and the upper faces of the toothlets. The holder accommodates the image pickup lens such that the image pickup lens can move in relation to the holder while contact between the protrusions and the sloped surfaces of the upper faces of the toothlets is maintained, whereby rotation of the retainer causes the image pickup lens to move while maintaining contact of the sloped surfaces with the protrusions, thereby moving the image pickup lens axially so as to carry out focus adjustment.

According to the fifth aspect, when the retainer having an aperture stop is rotated, the image pickup lens rotates and moves, since the image pickup lens is united with the retainer. The image pickup lens is held within the holder such that the upper faces of the toothlets, which are formed on a peripheral portion of the surface of the image pickup lens which faces an image plane, are in contact with the protrusions formed on the inner cylindrical wall of the holder. Rotation of the retainer causes the image pickup lens to move rotatively while contact between the protrusions and the sloped surfaces of the upper faces is maintained. Since the upper faces of the toothlets have sloped surfaces sloping along the circumference direction, the image pickup lens rotates while maintaining contact between the protrusions and the upper faces of the toothlets. Therefore, the image pickup lens rotates in accordance with the shape of the sloped surfaces of the upper faces of the toothlets; as a result, the image pickup lens moves axially. The image pickup lens moves rotatively while being accommodated within the holder, thereby maintaining a state in which the image pickup lens is united with the holder. Through axial movement of the image pickup lens, the image pickup lens can be focused.

According to the first aspect, in spite of employment of the unitary lens-and-holder structure, the image pickup lens can be focused through movement thereof. Thus, even when errors in manufacture of components or errors in attachment of a CCD or CMOS are of a large magnitude, the image pickup lens can be focused accordingly after assembly. Therefore, a small-sized, high-performance image pickup lens unit can be obtained. Furthermore, simplified assembly and a reduction in the number of components bring about a reduction in weight and cost and enhance suitability to mass production. Also, accuracy required of components is not very high, thereby reducing the cost of the components. By virtue of a synergetic effect of these affirmative factors, costs are reduced further. Additionally, macrophotographic adjustment is possible, thereby enhancing convenience.

According to the second aspect, in spite of employment of the unitary lens-and-holder structure, the image pickup lens can be readily focused after assembly through rotation of the retainer having an aperture stop. Thus, a high-performance image pickup lens unit can be obtained. Simplified assembly and a reduction in the number of components bring about a reduction in weight and cost and enhance suitability to mass production. Also, accuracy required of components is not very high, thereby reducing the cost of the components. By virtue of a synergetic effect of these affirmative factors, costs are reduced further.

According to the third aspect, in spite of employment of the unitary lens-and-holder structure, the image pickup lens can be readily focused after assembly through rotation thereof. Thus, a high-performance image pickup lens unit can be obtained. Since the retainer having an aperture stop is not employed, the number of components is reduced accordingly. Simplified assembly and a reduction in the number of components bring about a reduction in weight and cost and enhance suitability to mass production. Also, accuracy required of components is not very high, thereby reducing the cost of the components. By virtue of a synergetic effect of these affirmative factors, costs are reduced further.

According to the fourth aspect, in spite of employment of the unitary lens-and-holder structure, the image pickup lens can be readily focused after assembly through rotation of the retainer having an aperture stop. Thus, a high-performance image pickup lens unit can be obtained. Simplified assembly and a reduction in the number of components bring about a reduction in weight and cost and enhance suitability to mass production. Also, accuracy required of components is not very high, thereby reducing the cost of the components. By virtue of a synergetic effect of these affirmative factors, costs are reduced further. Additionally, the manufacture of the image pickup lens does not involve formation of the protrusion, thereby providing another affirmative factor for further reduction in cost.

According to the fifth aspect, in spite of employment of the unitary lens-and-holder structure, the image pickup lens can be readily focused after assembly through rotation of the retainer having an aperture stop. Thus, a high-performance image pickup lens unit can be obtained. Simplified assembly and a reduction in the number of components bring about a reduction in weight and cost and enhance suitability to mass production. Also, accuracy required of components is not very high, thereby reducing the cost of the components. By virtue of a synergetic effect of these affirmative factors, costs are reduced further.

BRIEF DESCRIPTION OF THE DRAWINGS

FIGS. 1A through 1D are plan views of the images pickup lens unit according to a first embodiment of the first invention and components of the image pickup lens, FIG. 1E is a longitudinal sectional view taken along the lines 1E and 1E of FIG. 1A, FIG. 1F is a longitudinal sectional view taken along the lines 1F and 1F of FIG. 1B, FIG. 1G is a longitudinal side view of FIG. 1C, FIG. 1H is a longitudinal sectional view taken along the lines 1H and 1H of FIG. 1D, FIG. 1I is a bottom view of FIG. 1A, FIG. 1J is a bottom view of FIG. 1B, FIG. 1K is a bottom view of FIG. 1C, and FIG. 1L is a bottom view of FIG. 1D;

FIGS. 2A through 2C are plan views of the image pickup lens unit according to a second embodiment of the present invention and components of the image pickup lens, FIG. 2D is a longitudinal sectional view taken along lines 2D and 2D of FIG. 2A, FIG. 2E is a longitudinal side view of FIG. 2B, FIG. 2F is a longitudinal sectional view taken along the lines 2F and 2F of FIG. 2C, FIG. 2G is a bottom view of FIG. 2A, FIG. 2H is a bottom view of FIG. 2B, and FIG. 2I is a bottom view of FIG. 2C;

FIGS. 3A through 3D are plan views of the image pickup lens unit according to a second embodiment of the present invention and components of the image pickup lens, FIG. 3E is a longitudinal sectional view taken along the lines 3E and 3E of FIG. 3A, FIG. 3F is a longitudinal sectional view taken along the lines 3F and 3F of FIG. 3B, FIG. 3G is a longitudinal side view of FIG. 3C, FIG. 3H is a longitudinal sectional view taken along the lines 3H and 3H of FIG. 3D, FIG. 3I is a bottom view of FIG. 3A, FIG. 3J is a bottom view of FIG. 3B, FIG. 3K is a bottom view of FIG. 3C, and FIG. 3L is a bottom view of FIG. 3D;

FIGS. 4A through 4D are plan views of the image pickup lens unit according to a fourth embodiment of the present invention and components of the image pickup lens, FIG. 4E is a longitudinal sectional view taken along the lines 4E and 4E of FIG. 4A, FIG. 4F is a longitudinal sectional view taken along the lines 4F and 4F of FIG. 4B, FIG. 4G is a longitudinal side view of FIG. 4C, FIG. 4H is a longitudinal sectional view taken along the lines 4H and 4H of FIG. 4D, FIG. 4I is a bottom view of FIG. 4A, FIG. 4J is a bottom view of FIG. 4B, FIG. 4K is a bottom view of FIG. 4C, and FIG. 4L is a bottom view of FIG. 4D;

DESCRIPTION OF THE PREFERRED EMBODIMENTS

Figure 5A:
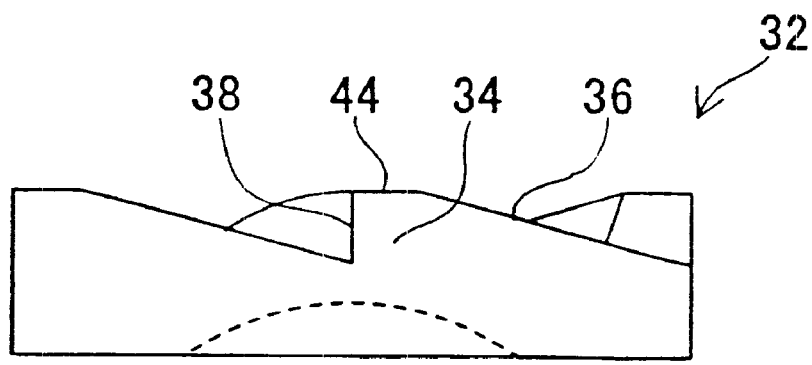
FIG. 5A is an enlarged side view of a second image pickup lens.

Embodiments of the present invention will next be described in detail with reference to the drawings.

Among four embodiments of the present invention, a first embodiment of the present invention will be described first. FIGS. 1A through 1L show an image pickup lens unit 2 according to the first embodiment. The image pickup lens unit 2 includes a first retainer 4 having an aperture stop, a first image pickup lens 6, and a holder 8.

The first retainer 4 assumes a circular cross section. A stop is formed at a central portion of the first retainer 4 such that the diameter reduces stepwise in the axial direction from the object side toward the image plane side. An object-side end portion of the first retainer 4 assumes the form of a flange. Two thin columnar leg portions 10 project from the image plane side of the first retainer 4 at symmetrically opposite positions.

The first image pickup lens 6 assumes a circular cross section. Three first ribs 16, each assuming the form of a hemisphere, project from the circumference of the first image pickup lens 6 in such a manner as to be arranged 120 degrees apart from one another. Two hole portions 12 are formed on the object side of the first image pickup lens 6 at symmetrically opposite positions. The leg portions 10 are press fitted into the corresponding hole portions 12 to thereby unite the first retainer 4 and the first image pickup lens 6. Alternatively, in place of press-fit engagement, the leg portions 10 may be loosely fitted into the corresponding hole portions 12, followed by bonding. In this case, the diameter of the leg portions 10 is reduced to allow a loose fit. Through unified engagement of the first retainer 4 and the first image pickup lens 6, rotation of the first retainer 4 causes the first image pickup lens 6 to rotate together.

The holder 8 assumes a substantially cylindrical shape such that the image-plane-side end portion thereof assumes an outside and an inside diameter greater than those of the remaining portion thereof. A rest portion 14 is formed annularly on the inner cylindrical wall of the holder 8 near the object-side end of the. holder 8. The rest portion 14 serves as a stopper for the first image pickup lens 6. Three adjustment grooves 18 are formed at equal spacings on a portion of the cylindrical wall of the holder 8 located between the object-side end and the rest portion 14. Each of the adjustment grooves 18 assumes the form of a gentle, stepwise, spiral. The longitudinal sectional view of FIG. 1 shows the adjustment groove 18 located on the far side of the sectional plane. The holder 8 accommodates the first image pickup lens 6 in a portion thereof extending between the object-side end and the rest portion 14. The image-plane-side surface of the first image pickup lens 6 comes into contact with the rest portion 14 upon maximum retraction of the image pickup lens 6. The first image pickup lens 6 is accommodated in the holder 8 such that the three first ribs 16 of the first image pickup lens 6 are fitted into the corresponding adjustment grooves 18. As the first image pickup lens 6 is rotated, the first ribs 16 move along the corresponding adjustment grooves 18. Since the adjustment grooves 18 each assume the form of a gentle, stepwise, spiral, movement of the first ribs 16 along the corresponding adjustment grooves 18 causes the first image pickup lens 6 to move in the axial direction of the holder 8 (in the axial direction of the first image pickup lens 6), whereby the first image pickup lens 6 can be focused.

In a mass production line, after the first retainer 4, the first image pickup lens 6, and the holder 8 are assembled into the above-described structure, the first retainer 4 is rotated slightly so as to focus the first image pickup lens 6 in an inspection-adjustment step, which is performed through observation of a monitored image. If needed, after the first image pickup lens 6 is focused, the first image pickup lens 6 and the holder 8 are bonded together. When a macrophotographic function is to be imparted to the image pickup lens unit 2, the first image pickup lens 6 and the holder 8 are not bonded, so that macrophotography is possible through rotation of the first retainer 4.

A second embodiment of the present invention will next be described. FIGS. 2A through 2I show an image pickup lens unit 52 according to the second embodiment. The image pickup lens unit 52 includes a first image pickup lens 6 and a holder 8. In place of a retainer having an aperture stop, the image pickup lens unit 52 employs a focusing/macrophotographic adjustment knob 20. Also, the object-side surface of the first image pickup lens 6 is subjected to printing at a peripheral portion thereof so as to form an aperture stop.

The focusing/macrophotographic adjustment knob 20 assumes the form of an crescent and includes a handle 22 projecting from the center of the crescent form. Leg portions 24 project from the corresponding end portions of the crescent form toward the image plane.

The first image pickup lens 6 assumes a circular cross section. Three first ribs 16, each assuming the form of a hemisphere, project from the circumference of the first image pickup lens 6 in such a manner as to be arranged 120 degrees apart from one another. The object-side surface of the first image pickup lens 6 is subjected to printing in black at a peripheral portion thereof so as to form an aperture stop. Only light impinging on an effective surface corresponding to the aperture stop is allowed to pass through the first image pickup lens 6. Two hole portions 12 are formed on the object side of the first image pickup lens 6 at symmetrically opposite positions. The leg portions 24 are press fitted into the hole portions 12 to thereby unite the focusing/macrophotographic adjustment knob 20 and the first image pickup lens 6. Alternatively, in place of press-fit engagement, the leg portions 24 may be loosely fitted into the hole portions 12, followed by bonding. In this case, the diameter of the leg portions 24 is reduced to allow a loose fit. Through unified engagement of the focusing/macrophotographic adjustment knob 20 and the first image pickup lens 6, rotation of the focusing/macrophotographic adjustment knob 20 causes the first image pickup lens 6 to rotate together.

Since the holder 8 assumes the same structure as that of the holder 8 of the first embodiment, further description of the structure of the holder 8 is omitted here. As in the case of the first embodiment, the holder 8 accommodates the first image pickup lens 6 in a portion thereof extending between the object-side end and the rest portion 14. The image-plane-side surface of the first image pickup lens 6 comes into contact with the rest portion 14 upon maximum retraction of the image pickup lens 6. The first image pickup lens 6 is accommodated in the holder 8 such that the three first ribs 16 of the first image pickup lens 6 are fitted into the corresponding adjustment grooves 18. As the first image pickup lens 6 is rotated, the first ribs 16 move along the corresponding adjustment grooves 18. Since the adjustment grooves 18 each assume the form of a gentle, stepwise, spiral, movement of the first ribs 16 along the corresponding adjustment grooves 18 causes the first image pickup lens 6 to move in the axial direction of the holder 8 (in the axial direction of the first image pickup lens 6), whereby the first image pickup lens 6 can be focused.

In a mass production line, after the focusing/macrophotographic adjustment knob 20, the first image pickup lens 6, and the holder 8 are assembled into the above-described structure, the focusing/macrophotographic adjustment knob 20 is rotated slightly so as to focus the first image pickup lens 6 in an inspection-adjustment step, which is performed through observation of a monitored image. If needed, after the first image pickup lens 6 is focused, the first image pickup lens 6 and the holder 8 are rigidly bonded. When a macrophotographic function is to be imparted to the image pickup lens unit 52, the first image pickup lens 6 and the holder 8 are not bonded, so that macrophotography is possible through rotation of the focusing/macrophotographic adjustment knob 20. When the image pickup lens unit 52 is to be used as a fixed-focus lens unit, the focusing/macrophotographic adjustment knob 20 is removed, and the first image pickup lens 6 and the holder 8 are rigidly bonded.

Next, a third embodiment of the present invention will be described. FIGS. 3A through 3L show an image pickup lens unit 54 according to the third embodiment. The image pickup lens unit 54 includes a focusing/macrophotographic adjustment knob 20, a second retainer 28 having an aperture stop, a first image pickup lens 6, and a holder 8.

The focusing/macrophotographic adjustment knob 20 assumes the form of a crescent and includes a handle 22 projecting from the center of the crescent form. Leg portions 24 project from the corresponding end portions of the crescent form toward the image plane.

The second retainer 28 assumes a circular cross section. A stop is formed at a central portion of the second retainer 28 such that diameter reduces stepwise in the axial direction from the object side toward the image plane side. Two thin columnar protrusions 31 project from the image plane side of the second retainer 28 at symmetrically opposite positions. Two second ribs 30, each assuming the form of a hemisphere, project from the circumference of the second retainer 28 in such a manner as to be arranged 180 degrees apart from each other. Two recesses 29 are formed on the object side of the second retainer 28 at symmetrically opposite positions. The leg portions 24 are press fitted into the corresponding recesses 29 to thereby unite the focusing/macrophotographic adjustment knob 20 and the second retainer 28. Alternatively, in place of press-fit engagement, the leg portions 24 may be loosely fitted into the corresponding recesses 29, followed by bonding. In this case, the diameter of the leg portions 24 is reduced to allow a loose fit. Through unified engagement of the focusing/macrophotographic adjustment knob 20 and the second retainer 28, rotation of the focusing/macrophotographic adjustment knob 20 causes the second retainer 28 to rotate together.

The first image pickup lens 6 assumes a circular cross section. Two hole portions 12 are formed on the object side of the first image pickup lens 6 at symmetrically opposite positions. The protrusions 31 are press fitted into the corresponding hole portions 12 to thereby unite the second retainer 28 and the first image pickup lens 6. Alternatively, in place of press-fit engagement, the protrusions 31 may be loosely fitted into the corresponding hole portions 12, followed by bonding. In this case, the diameter of the protrusions 31 is reduced to allow a loose fit. Through unified engagement of the second retainer 28 and the first image pickup lens 6, rotation of the second retainer 28 causes the first image pickup lens 6 to rotate together.

The holder 8 assumes a substantially cylindrical shape such that the image-plane-side end portion thereof assumes an outside and an inside diameter greater than those of the remaining portion thereof. A rest portion 14 is formed annularly on the inner cylindrical wall of the holder 8 near the object-side end of the holder 8. The rest portion 14 serves as a stopper for the first image pickup lens 6. Two adjustment grooves 18 are formed at opposite positions on a portion of the cylindrical wall of the holder 8 located between the object-side end and the rest portion 14. As in the case of the first embodiment, each of the adjustment grooves 18 assumes the form of a gentle, stepwise, spiral. The holder 8 accommodates the first image pickup lens 6 in a portion thereof extending between the object-side end and the rest portion 14. The image-plane-side surface of the first image pickup lens 6 comes into contact with the rest portion 14 upon maximum retraction of the image pickup lens 6. The first image pickup lens 6 is accommodated in the holder 8 such that the two second ribs 30 of the second retainer 28 are fitted into the corresponding adjustment grooves 18. As the second retainer 28 is rotated, the second ribs 30 move along the corresponding adjustment grooves 18. Since the adjustment grooves 18 each assume the form of a gentle, stepwise, spiral, movement of the second ribs 30 along the corresponding adjustment grooves 18 causes the first image pickup lens 6 to move in the axial direction of the holder 8 (in the axial direction of the first image pickup lens 6), whereby the first image pickup lens 6 can be focused.

In a mass production line, after the second retainer 28, the first image pickup lens 6, and the holder 8 are assembled into the above-described structure, the focusing/macrophotographic adjustment knob 20 is rotated slightly so as to focus the first image pickup lens 6 in an inspection-adjustment step, which is performed through observation of a monitored image. If needed, after the first image pickup lens 6 is focused, the second retainer 28 and the holder 8 are rigidly bonded. When a macrophotographic function is to be imparted to the image pickup lens unit 54, the second retainer 28 and the holder 8 are not bonded, so that macrophotography is possible through rotation of the focusing/macrophotographic adjustment knob 20. When the image pickup lens unit 54 is to be used as a fixed-focus lens unit, the focusing/macrophotographic adjustment knob 20 is removed, and the second retainer 28 and the holder 8 are rigidly bonded.

A fourth embodiment of the present invention will next be described. FIGS. 4A through 4L show an image pickup lens unit 56 according to the fourth embodiment. The image pickup lens unit 56 includes a third retainer 42 having an aperture stop, a second image pickup lens 32, and a holder 8.

The third retainer 42 assumes a circular cross section. A stop is formed at a central portion of the third retainer 42 such that the diameter reduces stepwise in the axial direction from the object side toward the image plane side. An object-side end portion of the third retainer 42 assumes the form of a flange, so that the remaining portion has an outside diameter substantially equal to the inside diameter of the holder 8, which will be described later. Two thin columnar leg portions 10 project from the image plane side of the third retainer 42 at symmetrically opposite positions.

The second image pickup lens 32 assumes a circular cross section. Two hole portions 12 are formed on the object side of the second image pickup lens 32 at symmetrically opposite positions. The leg portions 10 are press fitted into the corresponding hole portions 12 to thereby unite the third retainer 42 and the second image pickup lens 32. Alternatively, in place of press-fit engagement, the leg portions 10 may be loosely:fitted into the corresponding hole portions 12, followed by bonding. In this case, the diameter of the leg portions 10 is reduced to allow a loose fit. Through unified engagement of the third retainer 42 and the second image pickup lens 32, rotation of the third retainer 42 causes the second image pickup lens 32 to rotate together.

Figure 5B:
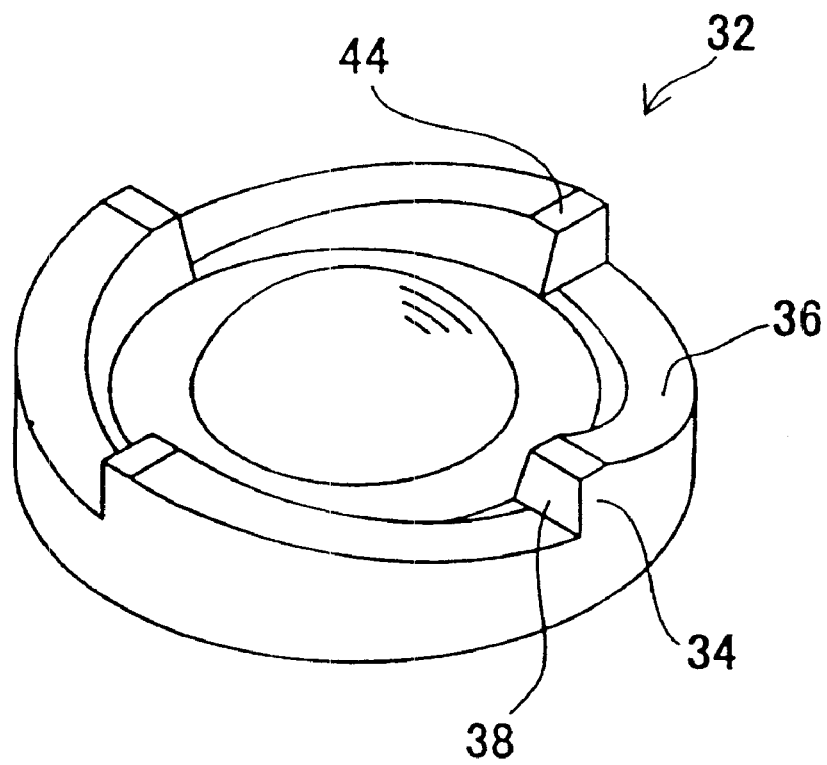
FIG. 5B is a perspective view of the second image pickup lens as viewed from the image plane side.
Figure 6:
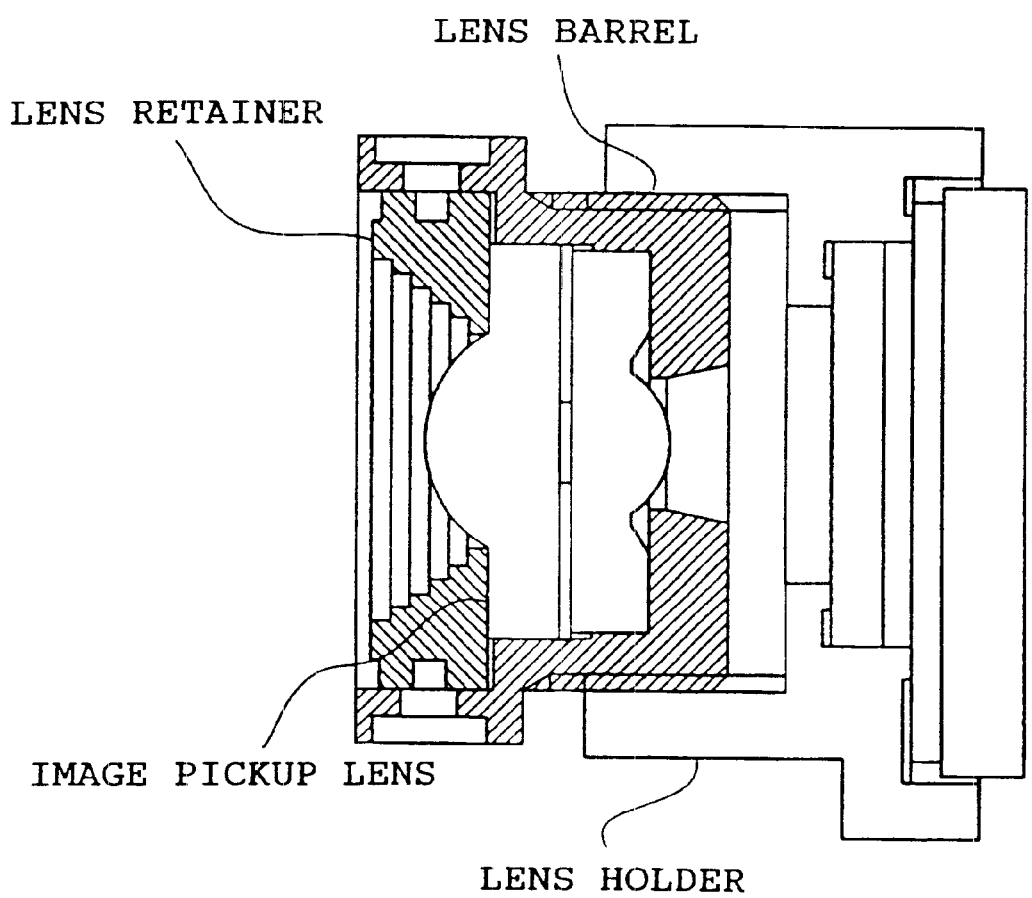
FIG. 6 is a longitudinal, partially sectional view showing a conventional image pickup lens unit for use with a CCD or CMOS.

FIG. 5A is an enlarged side view of the second image pickup lens 32, and FIG. 5B is a perspective view of the second image pickup lens 32 as viewed from the image plane side. Four toothlets 34 are formed annularly every 90 degrees on a peripheral portion of the image-plane-side surface of the image pickup lens 32. The toothlet 34 assumes the form of a substantial sawtooth. The upper face of the toothlet 34 includes a minor horizontal-surface portion 44 and a sloped portion 36, which slopes linearly and is curved along the circumference of the second image pickup lens 32. An upright portion 38 is formed between the horizontal-surface portion 44 and the sloped portion 36 of the adjacent toothlet 34.

The holder 8 assumes a substantially cylindrical shape such that the image-plane-side end portion thereof assumes an outside and an inside diameter greater than those of the remaining portion thereof. A rest portion 14 is formed annularly on the inner cylindrical wall of the holder 8 near the object-side end of the holder 8. Four lens holder ribs 40 are formed at 90-degree intervals on the object side of the rest portion 14 at the boundary between the rest portion 14 and the inner cylindrical wall of the holder 8. The lens retainer rib 40 is a protrusion assuming the form of a small rectangular parallelepiped. The holder 8 accommodates the second image pickup lens 32 in a portion thereof extending between the object-side end and the rest portion 14. The upper faces of the corresponding toothlets 34 of the second image pickup lens 32 are in contact with the lens holder ribs 40, whereby the second image pickup lens 32 are held on the lens holder ribs 40. When the second image pickup lens 32 is rotated, the sloped portions of the corresponding upper faces of the toothlets 34 slide on the corresponding lens holder ribs 40. Since the sloped portions 36 are sloped linearly, sliding of the sloped portions 36 on the corresponding lens holder ribs 40 causes the second image pickup lens 32 to move in the axial direction of the holder 8 (in the axial direction of the second image pickup lens 32), whereby the second image pickup lens 32 can be focused. The present embodiment employs four toothlets 34 and four lens holder ribs 40. The number of the toothlets 34 and the lens holder ribs 40 are not particularly limited, but is preferably two or more. If too many of the toothlets 34 and the lens holder ribs 40 are employed, the rotatable distance becomes too short.

In a mass production line, after the third retainer 42, the second image pickup lens 32, and the holder 8 are assembled into the above-described structure, the third retainer 42 is rotated slightly so as to focus the second image pickup lens 32 in an inspection-adjustment step, which is performed through observation of a monitored image. If needed, after the second image pickup lens 32 is focused, the third retainer 42 and the holder 8 are rigidly bonded. When a macrophotographic function is to be imparted to the image pickup lens unit 56, the third retainer 42 and the holder 8 are not bonded, so that macrophotography is possible through rotation of the third retainer 42. When the image pickup lens unit 56 is to be used as a fixed-focus lens unit, the third retainer 42 and the holder 8 are rigidly bonded.

According to the above-described first through fourth embodiments, although the image pickup lens unit has a unified lens-and-holder structure, the image pickup lens can be readily focused after assembly through rotation of a retainer having an aperture stop or through rotation of the image pickup lens. Thus, even when errors in manufacture of components or errors in attachment of a CCD or CMOS are of a large magnitude, the image pickup lens can still be focused accordingly. Therefore, a high-quality image pickup lens unit can be provided. Also, since there is no need to pursue extremely high accuracy with respect to components, the cost of components can be held down to a low level.

What is claimed is:

1. An image pickup lens unit comprising, as viewed from an object side:
    a retainer having an aperture stop;
    an image pickup lens; and
    a holder, wherein
        said retainer having an aperture stop and said image pickup lens are united with each other; and
        said holder assumes a substantially cylindrical shape and accommodates said image pickup lens such that said image pickup lens is united with said holder in a manner movable in relation to said holder, whereby movement of said retainer having an aperture stop causes said image pickup lens to move in relation to said holder so as to carry out focus adjustment.

2. An image pickup lens unit comprising, as viewed from an object side:
    a retainer having an aperture stop and assuming a circular cross section;
    an image pickup lens assuming a circular cross section; and
    a holder assuming a circular cross section, wherein
        said retainer having an aperture stop and said image pickup lens are united with each other;
        at least one protrusion is formed on a circumferential portion of said image pickup lens;
        said holder assumes a substantially cylindrical shape and has an elongated groove formed on an inner cylindrical wall of said holder in such a manner that the groove extends in the circumferential direction and inclines in the axial direction; and
        said holder accommodates said image pickup lens such that the protrusion is fitted into the elongated groove to thereby unite said image pickup lens with said holder in a manner movable along the elongated groove in relation to said holder, whereby rotation of said retainer having an aperture causes said image pickup lens to move along the elongated groove in relation to said holder, thereby moving said image pickup lens axially so as to carry out focus adjustment.

3. An image pickup lens unit according to claim 2, wherein two or three said protrusions and two or three said elongated grooves are provided.

4. An image pickup lens unit according to claim 2, wherein said protrusion assumes the form of a hemisphere.

5. An image pickup lens unit comprising, as viewed from an object side:
    an image pickup lens assuming a circular cross section; and
    a holder assuming a circular cross section, wherein
        a surface of said image pickup lens which faces an object, a surface of said image pickup lens which faces an image plane, or both of the surfaces are subjected to printing at a peripheral portion(s) of said image pickup lens so as to form an aperture stop;
        at least one protrusion is formed on a circumferential portion of said image pickup lens;
        said holder assumes a substantially cylindrical shape and has an elongated groove formed on an inner cylindrical wall of said holder in such a manner that the groove extends in the circumferential direction and inclines in the axial direction; and
        said holder accommodates said image pickup lens such that the protrusion is fitted into the elongated groove to thereby unite said image pickup lens with said holder in a manner movable along the elongated groove in relation to said holder, whereby rotation of said image pickup lens causes said image pickup lens to move along the elongated groove in relation to said holder, thereby moving said image pickup lens axially so as to carry out focus adjustment.

6. An image pickup lens unit according to claim 5, wherein two or three said protrusions and two or three said elongated grooves are provided.

7. An image pickup lens unit according to claim 5, wherein said protrusion assumes the form of a hemisphere.

8. An image pickup lens unit according to claim 5, further comprising a knob attached to said image pickup lens and adapted to carry out focus adjustment.

9. An image pickup lens unit comprising, as viewed from an object side:
    a retainer having an aperture stop and assuming a circular cross section;

an image pickup lens assuming a circular cross section; and a holder assuming a circular cross section, wherein
said retainer having an aperture stop and said image pickup lens are united with each other;
at least one protrusion is formed on a circumferential portion of said retainer having an aperture stop;
said holder assumes a substantially cylindrical shape and has an elongated groove formed on an inner cylindrical wall of said holder in such a manner that the groove extends in the circumferential direction and inclines in the axial direction; and
said holder accommodates said image pickup lens such that the protrusion is fitted into the elongated groove to thereby unite said retainer having an aperture stop with said holder in a manner movable along the elongated groove in relation to said holder, whereby rotation of said retainer having an aperture causes said image pickup lens to move along the elongated groove in relation to said holder, thereby moving said image pickup lens axially so as to carry out focus adjustment.

10. An image pickup lens unit according to claim 9, wherein two or three said protrusions and two or three said elongated grooves are provided.

11. An image pickup lens unit according to claim 9, wherein said protrusion assumes the form of a hemisphere.

12. An image pickup lens unit according to claim 9, further comprising a knob attached to said retainer having an aperture stop and adapted to carry out focus adjustment.

13. An image pickup lens unit comprising, as viewed from an object side:

a retainer having an aperture stop and assuming a circular cross section;

an image pickup lens assuming a circular cross section; and a holder assuming a circular cross section, wherein
said retainer having an aperture stop and said image pickup lens are united with each other;
at least two toothlets are formed on a peripheral portion of a surface of said image pickup lens which faces an image plane, such that upper faces of said toothlets have sloped surfaces formed along a circumference of said image pickup lens;
said holder assumes a substantially cylindrical shape and has at least two protrusions formed on an inner cylindrical wall of said holder so as to hold said image pickup lens through contact between the protrusions and the upper faces of the toothlets; and
said holder accommodates said image pickup lens such that said image pickup lens can move in relation to said holder while contact between the protrusions and the sloped surfaces of the upper faces of the toothlets is maintained, whereby rotation of said retainer having an aperture causes said image pickup lens to move while maintaining contact of the sloped surfaces with the protrusions, thereby moving said image pickup lens axially so as to carry out focus adjustment.

14. An image pickup lens unit according to claim 13, wherein the upper faces of the toothlets have horizontal surfaces formed in such a manner as to be continuous with highest ends of the sloped surfaces.

15. An image pickup lens unit according to claim 13, wherein the sloped surfaces are planes.

16. An image pickup lens unit according to claim 13, wherein two to four said toothlets and two to four said protrusions are provided.

17. An image pickup lens unit according to claim 16, wherein the toothlets assume the same height; the protrusions assume the same height; and the toothlet is formed such that a side view of the toothlet assumes a form of a substantial sawtooth.

* * * * *